2,892,822

ACRYLATE COPOLYMERS CONTAINING QUATERNARY AMMONIUM AND TERTIARY AMINE SALT UNITS

Russell Houston Gray and Vincent Joseph Webers, Middletown Township, Monmouth County, N.J., assignors to E. I. du Pont de Nemours and Company, Wilmington, Del., a corporation of Delaware No Drawing. Original application December 29, 1954, Serial No. 478,544, now Patent No. 2,839,401, dated June 17, 1958. Divided and this application March 29, 1956, Serial No. 574,593

8 Claims. (Cl. 260—86.1)

This invention relates to photography and more particularly to photographic silver halide emulsions containing copolymeric mordants for acid dyes. Still more particularly, it relates to photographic silver halide emulsions containing copolymers which have extralinear tertiary amino groups and quaternary ammonium groups. The invention also relates to these copolymers as new compounds.

An object of this invention is to provide light-sensitive silver halide emulsions that contain acid dye mordants which are non-diffusing and do not have a deleterious action on the silver halide grains. A futher and more specific object of the invention is to provide photographic silver halide emulsions which contain non-fogging copolymers which have extralinear tertiary amino groups and quaternary ammonium groups and which are effective mordants for acid dyes. By tertiary amino groups, we mean either the amino group itself or the acid salt thereof. A still further object is to provide such emulsions in which mordanted dye images of good resolution may be formed. Yet another object is to provide copolymeric dye mordants which are non-diffusing in water-permeable colloid layers and have no deleterious action on light-sensitive silver halides. Still other objects will be apparent from the following description of the invention.

It has been found that polymeric substituted or unsubstituted acrylic acid esters of amino alcohols having tertiary and quaternary salt groups in the proportion of 35% to 75% and preferably 35% to 65% of the former to 65% to 25% and preferably 65% to 35% of the latter can be prepared by polymerizing, preferably under an inert atmosphere, e.g., of nitrogen, a mixture of aqueous solutions of tertiary and quaternary monomeric, substituted or unsubstituted acrylic acid esters by the aid of an addition polymerization initiator, e.g., ammonium persulfate. The tertiary amine salt and the quaternary salt are employed in the same molecular proportions as set forth above for the component parts of the polymer.

The compounds provided by and used in accordance with this invention contain intralinear units of the general furmulae:

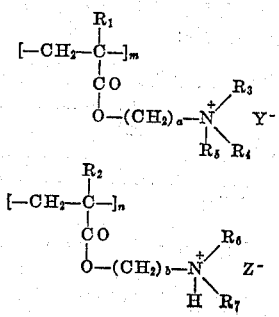

wherein $R_1$ and $R_2$ are hydrogen or alkyl groups of 1 to 2 carbon atoms, e.g., methyl and ethyl, $R_3$ and $R_4$ are alkyl radicals of 1 to 6 carbon atoms or taken together form a divalent hydrocarbon radical of 4 to 6 carbon atoms, $R_5$ is an alkyl radical of 1 to 18 carbon atoms, $R_6$ and $R_7$ are alkyl radicals of 1 to 6 carbon atoms or together form a divalent hydrocarbon radical of 4 to 6 carbon atoms, $m$ and $n$ are the number of monomer units in the copolymer which has a molecular weight of at least 2000; $a$ and $b$ are integers 2, 3 or 4; $Y^-$ is a non-photographically active anion and $Z^-$ is a non-photographically active anion, preferably of an oxygen-containing sulfur acid as described below. The quaternary ammonium salt units are present in the amount of 25 to 65 mol percent and ternary amine salt units in the amount of 75 to 35 mol percent.

Suitable alkyl radicals for $R_3$, $R_4$, $R_5$, $R_6$ and $R_7$ of the above formulae, include methyl, ethyl, propyl, butyl, pentyl, hexyl, heptyl, decyl, dodecyl, tetradecyl and octadecyl. In the case wherein $R_3$ and $R_4$ together and also $R_6$ and $R_7$ together form cyclic radicals with the nitrogen atoms, such radicals include pyrrolidine, piperidine and morpholine.

Among the useful initiators which can be used in the polymerization reactions, mention can be made of peroxygen compounds, e.g., ammonium persulfate, benzoyl peroxide and hydrogen peroxide, and azo catalysts, e.g., $\alpha,\alpha'$ azo-bisisobutyramidine hydrochloride.

In the event the rate of polymerization is too rapid, the reaction can be slowed or controlled by the addition of an inhibitor, e.g., tertiary-butyl catechol or oxygen.

In the preferred compounds, the anion of both the tertiary and quaternary salt groups is an anion of an oxygen-containing strong sulfur acid of ionization constant greater than $1 \times 10^{-4}$; suitable such acids are sulfuric, alkanesulfonic, ethanesulfonic, decanesulfonic acid and dodecanesulfonic acid; arylsulfonic acids, e.g., benzenesulfonic and p-toluenesulfonic acid; and cycloalkanesulfonic acids, e.g., cyclohexanesulfonic acid; alkylsulfuric acids wherein the alkyl group contains 1 to 6 carbon atoms, e.g., methylsulfuric acid. Other suitable anions include phosphate and perchlorate.

Suitable unsaturated esters of amino alcohols for the preparation of the tertiary and quaternary salts are described in Graves U.S. Patent 2,138,763. They can be made in accordance with Examples 1 through 11, or from suitable amino alcohols listed on page 5 of said patent. The preferred compounds for the preparation of the tertiary and quaternary salts are dimethylaminoethyl methacrylate and diethylaminoethyl methacrylate.

The quaternary salts of these unsaturated esters of amino alcohols can be made by quaternization of these esters with alkyl esters of the strong sulfur acids listed above at 0° C. to 70° C. or higher as described in Barney U.S. Patent 2,677,699 of May 4, 1954.

The tertiary salts can be made by the neutralization of the free base with suitable acids such as are described above.

The improved photographic emulsions and emulsion layers of this invention can be made by simply mixing the copolymers having tertiary and quaternary salt groups in the proportion of 35% to 75% of the former to 65% to 25% of the latter with an aqueous dispersion or emulsion of light-sensitive silver halide in a water-permeable colloid, which may contain the usual emulsion adjuvants, e.g., sensitizing dyes, hardeners, etc. prior to coating onto a suitable support or layer of a photographic element. In general, an amount of copolymer corresponding to 0.03 to 0.5 mols of nitrogen-containing monomers is used per 1.5 mols of silver halide. The resulting products have excellent mordanting properties with respect to acid dyes.

The novel tertiary/quaternary salt copolymeric mordants described above are non-diffusing in gelatin, polyvinyl alcohol and similar water-permeable colloid layers and are superior in many respects to the corresponding compounds containing 80% to 100% quaternary salt groups. The latter, while effective mordants, result in emulsions of excessive fog characteristics. The corresponding compounds containing only tertiary salt groups, in general, seriously lower the speed and gamma of the resultant product. Applicants have found that the presence of both tertiary and quaternary salt groups in the same polymer molecule in the above ratios produce emulsions of satisfactory photographic quality that have an excellent mordanting action for acid dyes. Mixtures of tertiary and quaternary homopolymers containing the equivalent amount of each group do not give the same results and result in intolerable fog or other undesirable photographic characteristics.

The water-permeable colloids used in the emulsions may be of any of the usual colloids used by photographic manufacturers. Thus the colloid may be gelatin, agar-agar, albumin, zein, collodion, polyvinyl alcohol, partially hydrolyzed polyvinyl acetate and hydrophilic copolymers thereof with ethylenically unsaturated monomers such as ethylene, vinyl chloride, etc.; polyvinyl acetals, e.g., the acetal of polyvinyl alcohol with acetaldehyde or benzaldehyde; or water-soluble or hydrophilic cellulose derivatives. Suitable hydrophilic or water-permeable colloids of the above types are described in U.S. Patents 2,110,491, 2,211,323, 2,276,322, 2,276,323, 2,286,215 and 2,397,866.

The preparation of a representative tertiary monomer and quaternary monomer will first be described, followed by examples of making the polymers containing tertiary and quaternary salt groups and photographic emulsions containing such salts.

PROCEDURE A (TERTIARY MONOMER)

A solution of methylsulfuric acid was prepared by stirring 100 g. (0.8 mol) of dimethyl sulfate with 148 cc. of water in a 500 ml. Erlenmeyer heat-resistant glass flask for twenty hours at 25 to 35° C. To this clear solution was added 148 grams (0.8 mol) of diethylaminoethyl methacrylate. The resulting neutral solution was diluted to 800 ml. to give a 1.0 molar solution. Twenty-five milligrams of t-butyl catechol was added to this solution to prevent polymerization during storage and to moderate the subsequent polymerization.

PROCEDURE B (QUATERNARY MONOMER)

Into a three-necked one-liter round-bottom flask equipped with a stirrer, thermometer and a dropping funnel, and surrounded with an ice-bath, were placed 500 ml. of dry acetone and 148 g. (0.8 mol) of diethylaminoethyl methacrylate. To this solution was added dropwise, with stirring, 100 g. (0.8 mol) of dimethyl sulfate, at such a rate that the temperature did not rise over 30° C. After addition was complete, the reaction mixture was stirred for one hour, then placed in a separatory funnel and shaken with 500 ml. of anhydrous ether. The quaternary monomer was separated and washed twice with further portions of ether. A 1.0 molar solution was made by diluting this material to 800 cc. with water, and 25 mg. of t-butyl catechol was added.

Example I

A copolymer containing 35 mol percent quaternary and 65 mol percent tertiary salt was prepared by admixing 35 ml. of the solution of methyldiethylmethacryloxyethylammonium methyl sulfate monomer of Procedure B above and 65 ml. of the solution of diethylaminoethyl methacrylate methylsulfate of Procedure A and 0.1 gram of ammonium persulfate and the mixture was heated to 50–55° C. under an atmosphere of nitrogen while stirring until polymerization was approximately complete (i.e., between 1 and 1.5 hours). The pH was kept between 6.5 to 7.5 by the addition of aqueous NaOH solution (5%). Sodium dimethyldithiocarbamate was added from 2% aqueous solution in the proportion of 15 ml. per liter of the polymerization mixture, in order to prevent further polymerization. The solution of copolymer of the above composition was allowed to cool and was diluted with water to 0.129 normal and stored at room temperature until used in a photographic emulsion.

Example II

The procedure of Example I was repeated except 55 ml. of the tertiary salt solution and 45 ml. of the quaternary salt solution were used to make a copolymer containing corresponding percentages of the respective salt groups.

Example III

The procedure of Example I was repeated except that 35 ml. of the tertiary salt solution and 65 ml. of the quaternary salt solution were used to make a copolymer containing corresponding percentages of the respective salt groups.

Example IV

A portion of each solution prepared in accordance with Examples I, II and III corresponding to 0.161 mols of monomer (approximately 50 grams of polymer) for each 1.5 mols of silver halide was added respectively to separate portions of a molten light-sensitive silver bromoiodide gelatin positive type emulsion of 0.6 mol percent silver iodide containing 1.5 mols of silver halide and 273 grams of gelatin. Similar solutions of mixtures of the same proportions of homopolymers containing the same tertiary salt groups only and homopolymers containing the same quaternary salt groups only and made by the polymerization procedures of Procedures A and B above, were added in like amount to emulsions in the manner described in the preceding paragraph.

Solutions of copolymers containing 75% and 55% quaternary salt and 25% and 45% tertiary salt groups and solutions of mixtures of homopolymers containing such salt groups were made and added in like amount to other emulsion portions.

After the addition of small amounts of chrome alum and saponin, the molten emulsions described in the two preceding paragraphs were coated on the gelatin sublayer of samples of cellulose triacetate film base and the respective photographic films were dried. After exposure in an Ib sensitometer and development in a developer of the following composition:

| | Grams |
|---|---|
| N-methyl-p-aminophenol sulfate | 0.46 |
| Hydroquinone | 3.4 |
| Sodium sulfite | 28.0 |
| Sodium carbonate (monohydrated) | 10.0 |
| Potassium bromide | .44 |
| Water to make 1.0 liter. | | for 3.5 minutes at 68° F. followed by fixation in a fixer of the following formula:

| | | |
|---|---|---|
| Sodium thiosulfate | grams | 240.0 |
| Sodium sulfite | do | 15.0 |
| Borax | do | 18.0 |
| Glacial acetic acid | ml | 12.0 |
| Potassium alum | grams | 20.0 |
| Water to make 1.0 liter. | | | for 5.0 minutes, the coated films were washed in running water and dried. Fog densities were determined with a Western Electric ERPD densitometer (described in J.S.M.P.E., 35, pages 184–200, August 1940) and were as follows:

| Mol Percent Quaternary | Mol Percent Tertiary | Fog Values | |
|---|---|---|---|
| | | Mixtures of Homopolymer Salts | Copolymers Containing Mixed Salt Groups |
| 35 | 65 | -------- | 0.00 |
| 45 | 55 | 0.57 | 0.03 |
| 55 | 45 | 0.57 | 0.04 |
| 65 | 35 | 0.64 | 0.18 |
| 75 | 25 | 0.84 | 0.31 |

Other strips of these respective films were fixed in a 24% solution of $Na_2S_2O_3 \cdot 5H_2O$, washed and dried. They were then immersed in the following acid dye solution for 30 minutes at 68° F.:

"Pontacyl" Carmine 6B Extra Concentrated (Colour Index No. 57), 1.56 grams
1% acetic acid to make 1.0 liter The dyed strips were rinsed in 1% acetic acid solution for 1 minute and cut into halves. One half was dried and the other half was washed in running water at 68° F. for 1 hour, then dried. The optical density of each sample at 540 mu was determined and the dye retained, calculated as follows:

$$\frac{\text{Density at 540 mu of washed strip}}{\text{Density at 540 mu of the unwashed strip}} \times 100 = \text{percent dye retention}$$

The dye retentions were found to be:

| Mol Percent Quaternary | Mol Percent Tertiary | Percent Dye Retention | |
|---|---|---|---|
| | | Mixtures of Homopolymer Salts | Copolymers containing Mixed Salt Groups |
| 35 | 65 | -------- | 64 |
| 45 | 55 | 41 | 32 |
| 55 | 45 | 30 | 35 |
| 65 | 35 | 41 | 47 |
| 75 | 25 | 37 | 46 |

This indication of effective dye mordanting was confirmed by obtaining dye images of enhanced resolution when acid dye resolution images were transferred onto these films from a hardened gelatin matrix resolution image. (If no mordant is present in similar film coatings, the percent dye retention will not exceed 5 percent.)

*Example V*

Copolymers containing both tertiary and quaternary salt groups and mixtures of homopolymers containing tertiary and quaternary salt groups only as described in Example I were used to prepare another set of coatings by the procedure described in Example IV.

Sensitometric analysis of the films exposed, processed, and densities determined as in Example IV yielded the following results:

| Mol Percent Quaternary | Mol Percent Tertiary | Mixtures of Homopolymer Salts | | | Copolymers Containing Mixed Salt Groups | | |
|---|---|---|---|---|---|---|---|
| | | Speed | Gamma | Fog | Speed | Gamma | Fog |
| 0 | 100 | 0.03 | 1.00 | 0.01 | ---- | ---- | ---- |
| 35 | 65 | ---- | ---- | ---- | 0.17 | 2.73 | 0.03 |
| 45 | 55 | 0.30 | 2.43 | 0.28 | 0.18 | 2.67 | 0.02 |
| 55 | 45 | 0.31 | 2.30 | 0.29 | 0.42 | 2.67 | 0.04 |
| 65 | 35 | 0.36 | 2.19 | 0.30 | 0.48 | 2.35 | 0.06 |
| 75 | 25 | 0.32 | 2.07 | 0.35 | 0.50 | 2.43 | 0.13 |
| 100 | 0 | 0.43 | 2.58 | 0.41 | ---- | ---- | ---- |

Other strips were tested for mordanting action in accordance with the procedure as given in Example IV with the following results:

| Mol Percent Quaternary | Mol Percent Tertiary | Percent Dye Retention | |
|---|---|---|---|
| | | Mixtures of Homopolymer Salts | Copolymers containing Mixed Salt Groups |
| 0 | 100 | 50 | -------- |
| 35 | 65 | ---- | 60 |
| 45 | 55 | 47 | 48 |
| 55 | 45 | 49 | 54 |
| 65 | 35 | 63 | 40 |
| 75 | 25 | 58 | 66 |
| 100 | 0 | 68 | -------- |

*Example VI*

Copolymers of the kind described in Example I but containing quaternary salt groups and tertiary salt groups in the amounts given in the following table were made as described in that example. The copolymers were used to make emulsion coatings which were made, exposed, developed, fixed and tested for dye mordanting properties as described in Example IV with the following results:

| Mol Percent Quaternary | Mol Percent Tertiary | Speed | Gamma | Fog | Percent Dye Retention |
|---|---|---|---|---|---|
| 25 | 75 | 0.10 | 1.92 | .03 | 42 |
| 35 | 65 | 0.26 | 2.73 | .04 | 60 |
| 42 | 58 | 0.41 | 2.59 | .07 | 55 |
| 45 | 55 | 0.49 | 2.81 | .07 | 51 |
| no mordant | no mordant | 0.12 | 1.98 | .09 | 6.9 |

In the foregoing examples, actinic light was excluded during the preparation of the photographic emulsions and emulsion layers until after development and fixing.

In place of the specific copolymers containing both tertiary and quaternary salt groups described in the foregoing examples, there can be made and used in photographic emulsions and emulsion layers other such copolymers as shown under the general formula given above. Mixtures of two or more of such copolymers, each containing tertiary and quaternary salt groups can be used. The polymerizations can be carried out at temperatures from 40° C. to 100° C. or more and for a period of ½ to 3 or more hours.

Among the additional acid dyes which can be mordanted by means of the copolymeric tertiary/quaternary salts of this invention are:

Anthracene Yellow GR (400% pure Schultz No. 177)
Fast Red S Conc. (Colour Index 176)
Pontacyl Green SN Ex. (Colour Index 737)
Acid blue black (Colour Index 246)
Acid Magenta O (Colour Index 692)
Naphtol Green B Conc. (Colour Index 5)
Brilliant Paper Yellow Ex. Conc. 125% (C. I. 364)
Tartrazine (Colour Index 640)
Metanil Yellow Conc. (Colour Index 138)
Pontacyl Scarlet R Conc. (Colour Index 487)
Pontacyl Rubine R Ex. Conc. (Colour Index 179)

It is obvious from the above that the invention is not limited to the use of the gelatin coated cellulose triacetate film base since the water-permeable silver halide emulsion layers containing the copolymeric tertiary/quaternary salts can be coated on various supports, e.g., baryta coated paper or cardboard or water-proofed or transparentized paper or a film. For instance, the film support may be a hydrophobic superpolymer, e.g., a polyamide, a polyester such as polyethylene terephthalate, a polyvinyl acetal, polystyrene, polyvinyl chloride and a poly(vinyl chloride co vinyl acetate). The coated film base described in Alles et al. U.S. Patent No. 2,627,088 is especially useful as a base sheet.

An advantage of the invention is that it provides a new class of copolymeric salts which have utility in various arts. Since they are quite water-soluble, they can be applied from aqueous solutions. Thus the solutions can be used for antistatic coatings on photographic film bases or cellophane, emulsifying agents for wax, oil or insecticide dispersions, surface modifiers for glass or silica, dye fixatives for acid dyes or textile modifiers.

The copolymeric salts are especially useful as mordants for acid dyes in photographic processes. Premordanted light-sensitive photographic films containing the novel polymeric salts in light-sensitive water-permeable colloid silver halide emulsion layers are useful, for example, in preparing dye imbibition or dye transfer prints by transfer from a hardened gelatin matrix. The premordanted films may be exposed and processed before dye transfer so that the film will bear records of silver, e.g., an optical sound track.

A further advantage of the invention is that the copolymeric tertiary/quaternary salts do not fog silver halide emulsion layers and can be incorporated directly therein. This means that a useful photographic film can be made in a simple manner. Other monomeric or homopolymeric acid dye mordants described in the prior art have had to be used in separate contiguous coatings on silver halide layers due to their undesirable photographic action, thus making these films more costly to manufacture. The use of the mordant in the silver halide layer produces dye images of increased sharpness. The premordanted films so produced are easier to process. Still other advantages will be apparent from the above.

This application is a division of parent application Serial No. 478,544 filed December 29, 1954, which claims photographic emulsions containing mordanting amounts of the linear addition copolymers described above. The said application issued as U.S. Patent 2,839,401 on June 17, 1958.

The embodiments of the invention in which an exclusive property or privilege is claimed are defined as follows:

1. Linear addition polymers consisting essentially of intralinear quaternary ammonium salt and ternary amine salt units of the formulae:

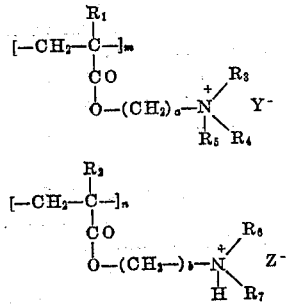

wherein $R_1$ and $R_2$ are members taken from the group consisting of hydrogen and alkyl groups of 1 to 2 carbon atoms, $R_3$ and $R_4$ when separate are alkyl radicals of 1 to 6 carbon atoms and when joined form with the nitrogen atom a heterocyclic radical comprising 4 to 6 carbon atoms, $R_5$ is an alkyl radical of 1 to 18 carbon atoms, $R_6$ and $R_7$ when separate are alkyl radicals of 1 to 6 carbon atoms and when joined together form with the nitrogen atom a heterocyclic radical comprising 4 to 6 carbon atoms, $a$ and $b$ are positive integers of 2 to 4 inclusive, $m$ and $n$ are the number of monomer units in the copolymer and $Y^-$ and $Z^-$ are non-photographically active anions; said monomer units being present in the mol percent ratio of 65 to 25% of the former to 35 to 75% of the latter.

2. Copolymers as set forth in claim 1 wherein said anion is of an oxygen-containing strong sulfur acid of ionization constant greater than $1 \times 10^{-4}$.

3. Copolymers consisting essentially of $\alpha$-alkacrylic acid esters of saturated aliphatic amino alcohols wherein the alk radical contains 1 to 2 carbon atoms having intralinear units containing tertiary amine salt and quaternary ammonium salt groups in the proportion of 35 to 75 mol percent of the former to 65 to 25 mol percent of the latter.

4. Copolymers consisting essentially of $\alpha$-methacrylic acid esters of amino alcohols having intralinear units containing tertiary amine salt and quaternary ammonium salt groups in the proportion of 35 to 75 mol percent of the former to 65 to 25 mol percent of the latter, the salt forming anion being from an oxygen-containing strong sulfur acid of ionization constant greater than $10^{-4}$.

5. Copolymers consisting essentially of dimethylaminoethyl methacrylate having intralinear units containing tertiary amine salt and quaternary ammonium salt groups in the proportion of 35 to 75 mol percent of the former to 65 to 25 mol percent of the latter, the salt forming anion being of an oxygen-containing strong sulfur acid of ionization constant greater than $10^{-4}$.

6. A copolymer as set forth in claim 5 wherein said acid anion is methylsulfate.

7. Copolymers consisting essentially of diethylaminoethyl methacrylate having intralinear units containing tertiary amine salt and quaternary ammonium salt groups, said salt groups being present in the proportion of 35 to 75 mol percent of the former to 65 to 25 mol percent of the latter, the salt forming anion being of an oxygen-containing strong sulfur acid of ionization constant greater than $10^{-4}$.

8. A copolymer as set forth in claim 7 wherein said acid anion is methylsulfate.

References Cited in the file of this patent
UNITED STATES PATENTS

| | | |
|---|---|---|
| 2,677,699 | Barney | May 4, 1954 |
| 2,810,713 | Melamed | Oct. 22, 1957 |

UNITED STATES PATENT OFFICE
CERTIFICATE OF CORRECTION

Patent No. 2,892,822 — June 30, 1959

Russell Houston Gray et al

It is hereby certified that error appears in the printed specification of the above numbered patent requiring correction and that the said Letters Patent should read as corrected below.

Column 1, line 56, for "furmulae" read -- formulae --; column 2, line 36, after "sulfonic" insert -- acids of 1 to 12 carbon atoms, e.g., methanesulfonic --.

Signed and sealed this 3rd day of November 1959.

(SEAL)
Attest:

KARL H. AXLINE
Attesting Officer

ROBERT C. WATSON
Commissioner of Patents